United States Patent [19]

Williams

[11] 3,803,681

[45] Apr. 16, 1974

[54] THREAD CUTTING HACKSAW BLADE
[75] Inventor: Leslie H. Williams, Lander, Wyo.
[73] Assignee: The Raymond Lee Organization, Inc., New York, N.Y.
[22] Filed: Dec. 4, 1972
[21] Appl. No.: 312,200

[52] U.S. Cl............... 29/78, 10/111, 83/835, 83/697
[51] Int. Cl...... B23d 71/04, B23g 5/00, B23g 1/26, B23c 3/28
[58] Field of Search........ 10/110, 111, 113; 30/357, 30/334; 29/78; 83/835

[56] References Cited
UNITED STATES PATENTS

| | | | |
|---|---|---|---|
| 1,382,841 | 6/1921 | Lynn | 10/111 X |
| 1,810,746 | 6/1931 | Babin et al | 83/697 X |
| 604,603 | 5/1898 | Caruthers | 83/835 |

Primary Examiner—Donald R. Schran

[57] ABSTRACT

A saw blade for a hacksaw adapted for cutting threads comprising an elongated relatively flat member having relatively thin ends and a relatively thick main body, one longitudinal edge of the member having pointed cutting teeth which are beveled on the sides to form cutting edges and which are angled at 60°.

1 Claim, 5 Drawing Figures

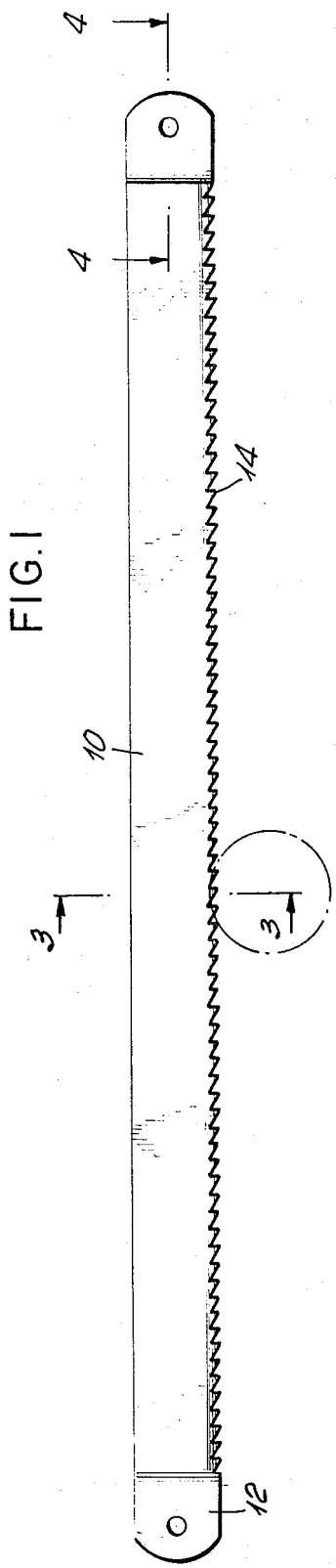
FIG. I
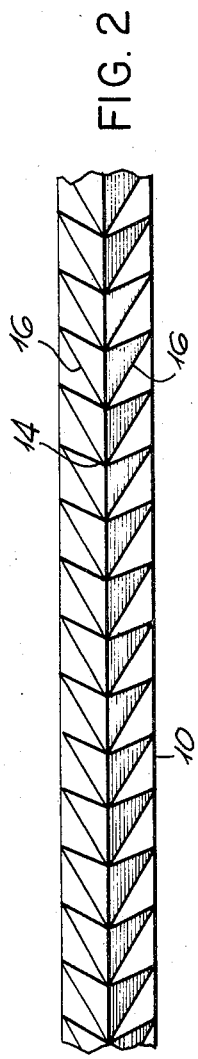
FIG. 2
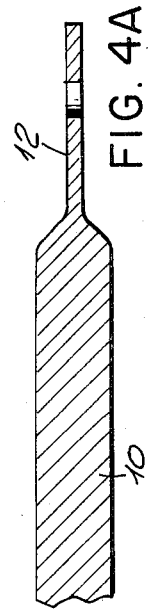
FIG. 4A
FIG. 4B
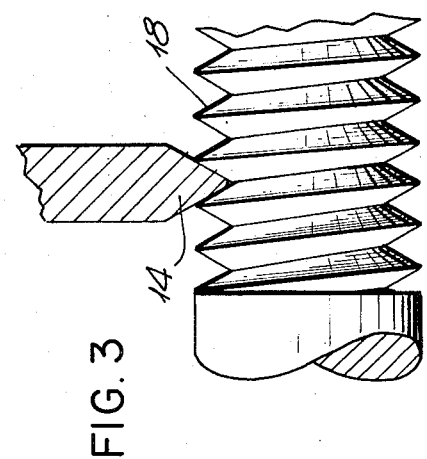
FIG. 3

THREAD CUTTING HACKSAW BLADE

SUMMARY OF THE INVENTION

My invention is directed toward a saw blade adapted to fit in any hacksaw frame and having teeth so shaped as to cut badly distorted thread with ease as well as cutting swollen threads down to size by following the contour. The blade functions in such manner that it is easier and faster to use than a thread chasing file.

To this end, the blade has a longitudinal edge having coplanar cutting teeth which are pointed at 60° and have beveled sides to form a cutting edge. The blade can be made in any width but has thinned down ends to fit in the hacksaw frame. Relatively large widths can be wedge shaped to save steel.

BRIEF DESCRIPTION OF THE DRAWINGS

In the drawings:
FIG. 1 is a side elevation of my blade;
FIG. 2 is an edge view thereof;
FIG. 3 shows the invention in use; and
FIGS. 4A and 4B are cross sections of the blade showing different thicknesses.

DETAILED DESCRIPTION OF PREFERRED EMBODIMENTS

An elongated flat blade made of same steel as better grade hacksaw blades has a main body section 10 and thinned ends 12. The ends are thinned to 0.025 inches to fit any hacksaw frame. The width of the section 10 can be as desired but one-sixteenth inch is a most common thickness. Larger widths can be wedge shaped to save steel.

One longitudinal edge of the blade has coplanar 60° pointed teeth 14 beveled at each side 16 to form cutting edges.

The blade can be used to cut threads 18 as shown.

While I have described my invention with particular reference to the drawings, such is not to be considered as limiting its actual scope.

Having thus described this invention, what is asserted as new is:

1. A sawblade for a hacksaw which can be used in cutting threads comprising:
    an elongated flat member having relatively thin ends and a relatively thick body, one longitudinal edge of the member having pointed cutting teeth;
    wherein said teeth are angled at 60° and beveled on the sides to form cutting edges; and
    wherein the ends are thinned to fit any hacksaw frame.

* * * * *